(12) United States Patent
Takahashi et al.

(10) Patent No.: US 8,817,117 B2
(45) Date of Patent: Aug. 26, 2014

(54) CAMERA SYSTEM, SIGNAL DELAY AMOUNT ADJUSTING METHOD AND PROGRAM

(75) Inventors: Hiroaki Takahashi, Kanagawa (JP);
Satoshi Tsubaki, Kanagawa (JP);
Tamotsu Munakata, Kanagawa (JP);
Eisaburo Itakura, Kanagawa (JP);
Hideaki Murayama, Kanagawa (JP)

(73) Assignee: Sony Corporation (JP)

( * ) Notice: Subject to any disclaimer, the term of this patent is extended or adjusted under 35 U.S.C. 154(b) by 58 days.

(21) Appl. No.: 13/266,146

(22) PCT Filed: Mar. 24, 2011

(86) PCT No.: PCT/JP2011/001742
§ 371 (c)(1),
(2), (4) Date: Jan. 4, 2012

(87) PCT Pub. No.: WO2011/121951
PCT Pub. Date: Oct. 6, 2011

(65) Prior Publication Data
US 2012/0098980 A1    Apr. 26, 2012

(30) Foreign Application Priority Data
Mar. 31, 2010    (JP) ................. P2010-082340

(51) Int. Cl.
*H04N 5/232*    (2006.01)
(52) U.S. Cl.
USPC ............ 348/211.11; 348/211.12; 348/211.13; 348/211.14

(58) Field of Classification Search
USPC ................... 348/222.1, 262, 211.11–211.14; 709/203, 204; 370/259, 260
See application file for complete search history.

(56) References Cited

U.S. PATENT DOCUMENTS 5,307,168 A  *  4/1994  Tashiro ....................... 348/64
5,371,535 A      12/1994  Takizawa
(Continued)

FOREIGN PATENT DOCUMENTS

EP    1339182 A3    8/2003
EP    2114053 A1    11/2009
(Continued)

OTHER PUBLICATIONS

Office Action from Chinese Application No. 201180002167.6, dated Dec. 10, 2013.
(Continued)

*Primary Examiner* — Yogesh Aggarwal
(74) *Attorney, Agent, or Firm* — Lerner, David, Littenberg, Krumholz & Mentlik, LLP

(57) ABSTRACT

A camera system having a plurality of camera pairs is provided. Each pair may have a camera control unit and a camera head unit respectively connected together by way of an asynchronous transmission network. The camera system may also have a central processing unit configured to obtain a video signal delay amount, representative of a time delay between a respective camera control unit and its respective camera head unit, for each of the plurality of camera pairs, and to adjust the video signal delay amount between at least one said camera control unit and its respective camera head unit to be equal to a selected video signal delay amount of another said camera control unit and its respective camera head unit.

10 Claims, 6 Drawing Sheets

(56) References Cited

U.S. PATENT DOCUMENTS

| | | |
|---|---|---|
| 7,436,456 B2 | 10/2008 | Morel et al. |
| 7,903,694 B2 | 3/2011 | Defrance et al. |
| 2004/0257469 A1 | 12/2004 | Compton et al. |
| 2006/0136972 A1 | 6/2006 | Metzger et al. |

FOREIGN PATENT DOCUMENTS

| | | |
|---|---|---|
| JP | 63-140378 A | 6/1988 |
| JP | 09-238277 A | 9/1997 |
| JP | 2003-134080 A | 5/2003 |
| JP | 2004-304809 A | 10/2004 |
| JP | 2004-343697 A | 12/2004 |
| JP | 2005203875 A | 7/2005 |
| JP | 2007-312223 A | 11/2007 |
| JP | 2009-296323 A | 12/2009 |
| JP | 2010-021935 A | 1/2010 |

OTHER PUBLICATIONS

Supplementary European Search Report from EP Application No. 11762203, dated Jan. 2, 2014.

* cited by examiner

CAMERA SYSTEM, SIGNAL DELAY AMOUNT ADJUSTING METHOD AND PROGRAM

TECHNICAL FIELD

1. Cross-References to Related Applications

The present application is a national phase entry under 35 U.S.C. §371 of International Application No. PCT/JP2011/001742 filed Mar. 24, 2011, published on Oct. 6, 2011 as WO 2011/121951 A1, which claims priority from Japanese Patent Application No. 2010-082340 filed in the Japanese Patent Office on Mar. 31, 2010, the entire content of which is incorporated herein by reference.

2. Technical Field

The present invention relates to a camera system, a signal delay amount adjusting method and a program.

BACKGROUND ART

Patent Literature 1 below has disclosed, for example, a camera control apparatus capable of controlling a plurality of cameras by one unit thereof. Patent Literature 1 has disclosed a configuration in which a CHU and a CCU are connected via a camera cable on a one-to-one basis to transmit reference signals and video signals.

Further, Patent Literature 2 below has disclosed a method using an asynchronous switching network (an asynchronous transmission network) for transmitting between the CHU and the CCU.

CITATION LIST

Patent Literature

PTL 1: Japanese Unexamined Patent Application Publication No. 09-238277
PTL 2: Japanese Unexamined Patent Application Publication No. 2004-304809

SUMMARY

In an aspect of the invention, a camera system having a plurality of camera pairs is provided. Each pair may have a camera control unit and a camera head unit respectively connected together by way of an asynchronous transmission network. The camera system may also have a central processing unit configured to obtain a video signal delay amount, representative of a time delay between a respective camera control unit and its respective camera head unit, for each of the plurality of camera pairs, and to adjust the video signal delay amount between at least one said camera control unit and its respective camera head unit to be equal to a selected video signal delay amount of another said camera control unit and its respective camera head unit.

In another aspect of the invention, a signal delay amount adjustment method is provided. Such method may include obtaining a video signal delay amount for each of a plurality of camera control units respectively connected to a plurality of camera head units via an asynchronous transmission network, such that each camera control unit is connected to a respective camera head unit via the asynchronous transmission network, in which a respective video signal time delay is representative of a time delay between a respective camera control unit and its respective camera head unit. The method may further include adjusting the video signal delay amount between one said camera control unit and its respective camera head unit to be equal to a selected video signal delay amount of another said camera control unit and its respective camera head unit.

In a further aspect of the invention, a video camera system having a plurality of camera pairs is provided. Each pair may have a camera control unit and a camera head unit connected via an asynchronous transmission network, in which each said camera head unit has a video buffer. The video camera system may also have a central processing unit configured: to obtain a signal delay time for each of the plurality of camera pairs so as to obtain a plurality of signal delay times; to select a largest signal delay time from the plurality of signal delay times; to determine if the largest signal delay time exceeds a predetermined allowable time; to obtain a video buffer size that corresponds to the largest signal delay time, when a determination result indicates that the largest signal delay time does not exceed the predetermined allowable time; and to adjust a size of the video buffer of at least one of the camera head units to the obtained video buffer size.

In yet a further aspect of the invention, a camera control unit is provided. The camera control unit may have a network interface that enables communication to a corresponding camera head unit via an asynchronous transmission network, in which the camera control unit and the corresponding camera head unit form a camera pair and in which the network interface also enables communication with a number of other camera pairs via the asynchronous transmission network, each of the number of other camera pairs having a respective camera control unit in communication with its camera head unit. The camera control unit may also have a central processing unit configured to obtain video signal delay amounts representative of respective time delays of the camera pair and each of the number of other camera pairs, each time delay being indicative of the time delay between a respective camera control unit and its corresponding camera head unit. The central processing unit may also be configured to adjust a video signal delay amount for at least one pair of the number of other camera pairs and the camera pair to be equal to a selected one of the obtained video signal delay amounts.

When a video transmission is performed using the asynchronous transmission network as described in the Patent Literature 2, a transmission path varies for each combination of each of the CHU and the CCU, and therefore, a delay amount will be varied. For this reason, it is necessary to align arrival timing of video signals in each of the CCU by adjusting timing. Especially, since a route path is not fixed on the asynchronous transmission network and the route path varies depending on the situation, it is difficult to adjust timing of the video signals.

Moreover, since a development of a camera system increases flexibility in case of the asynchronous transmission network, it is preferable that switching an asynchronous transmission wire such as a LAN cable, or a device such as a switching hub, a router, or the like, for example, can be flexibly accepted. In such case, adjusting timing of the video signals will be difficult.

Further, by using the asynchronous transmission network, when a failure occurs on the route path currently in use, there is an advantage in developing a redundant configuration against the failure on a transmission device by changing into a different route path, however, it is also necessary to adjust the timing of the video signals in a flexible way according to the change of the route path.

Further, due to a bandwidth limitation of the asynchronous transmission network, it is assumed that transmission may be performed after a video compression (encoding) in the CHU to compress (decoding) the compressed image in the CCU. In this case, it is necessary to consider a delay due to the encoding and decoding, accompanying with complicated processing for adjusting timing.

In light of the foregoing, it is desirable to provide a camera system, a signal delay amount adjusting method, and a program, which are novel and improved, and which are capable of easily adjusting timing of video signals when a plurality of cameras are connected via an asynchronous transmission network.

DESCRIPTION OF EMBODIMENTS

Figure 1:
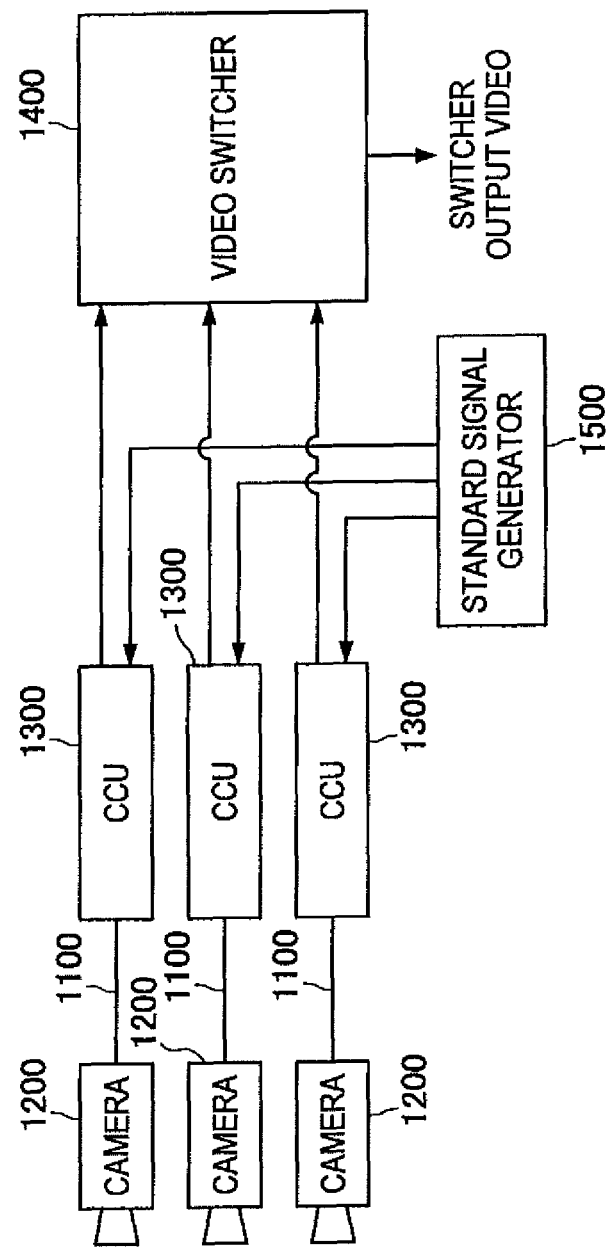
FIG. 1 is a block diagram for illustrating a camera control system in which a camera (CHU) and a CCU are connected in a one-to-one basis.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The explanation will be given in the order shown below.
1. Technological Basis
2. Configuration Example of a Camera System According to the Present Embodiment
3. Procedure of a System According to the Present Embodiment 1. Technological Basis FIG. 1 is a block diagram for illustrating a camera control system in which a camera and a CCU are connected in a one-to-one basis so as to arrange or form a camera pair. This camera system is the one used in a studio of a TV station, or the like, in which a CHU 1200 and a CCU 1300 are connected via a camera cable 1100 on a one-to-one basis, and reference signals and video signals are transmitted. The camera system transmits/receives signals, such as video signals or return video signals, among a plurality of the CCU (Camera Control Unit) 1300 as a camera control apparatus, a plurality of the CHU (Camera Head Unit) 1200 connected to each of the CCU 1300 so as to arrange or form a plurality of camera pairs via the camera cable 1100, and the CCU 1300, and is configured from a video switcher 1400 for outputting video signals corresponding to the CHU 1200 and the CCU 1300 that have been selected, and a standard signal generator 1500 for outputting a standard signal that is a reference for establishing a video synchronization between each of the CHU 1200 and the CCU 1300.

The video switcher 1400 switches the video signals received from each of the CCU 1300 in accordance with selection to output. In order not to distort the video signals at a time of video switching, it is necessary that each of the video signals is synchronized, and that each of the CCU 1300 receives the video signals, which have been synchronized to the reference signal from the standard signal generator 1500, from the CHU 1200. The CCU 1300 transmits the reference signal from the standard signal generator 1500 to the CHU 1200, while the CHU 1200 transmits the video signals synchronized to the reference signal to the CCU 1300.

However, although the video signals is synchronized to the reference signal, a timing error occurs in the actual video signals arrived at the video switcher 1400 due to a factor, such as a transmission delay of the camera cable connecting the CHU 1200 and the CCU 1300, a delay in processing in the CCU 1300, or the like. Therefore, in an input stage of the video switcher 1400, a fine adjustment is to be performed for a transmitting timing of the video signals in the CHU 1200 so that the timing of each of the video signals from the each of the CCU 1300 can be matched. This assures an identity of input timings of the video signals transmitted from the CHU 1200, in the video switcher 1400.

The adjustment of the transmitting timing can be performed by a phase regulation in a PLL (Phase Locked Loop) of the CHU 1200 (camera). Performing a delay adjustment by the PLL phase regulation on the side of the camera realizes an adjustment of the input timing of the video signal at low cost and at low power consumption without creating a buffer for the timing adjustment of video data or audio data. However, in this method, range allowed to be delayed from a standard signal form is limited to within one field of the video signal. When a delay adjustment on the side of the CCU 1300 is performed, or when a delay adjustment is performed over one field, a delay adjustment using the buffer for video data and audio data is necessary.

As described above, FIG. 1 shows a configuration in which the CHU 1200 and the CCU 1300 are connected via the camera cable on a one-to-one basis, and reference signals and video signals are transmitted. In this configuration, since the factors, such as a transmission delay of the camera cable, the delay in processing in the CCU 1300, are resolved, it is necessary to perform the timing adjustment. On the other hand, as described before, there exists a method using the asynchronous transmission network for transmission between the CHU 1200 and the CCU 1300. In the asynchronous transmission network, each of the CCU 1300 and the CHU 1200 transmits the reference signal or the video signal on the same transmission network. In this case, as described before, as the route path is not fixed and the route path varies in accordance with situation, an amount of the timing adjustment of the signals is not to be uniquely defined. Therefore, there is a difficulty in the timing adjustment of the video signals and the audio signals. In light of the foregoing, the present embodiment is aimed to adjust optimally a timing of signals in a camera system using an asynchronous transmission network.

2. Configuration Example of a Camera System According to the Present Embodiment

Figure 2:
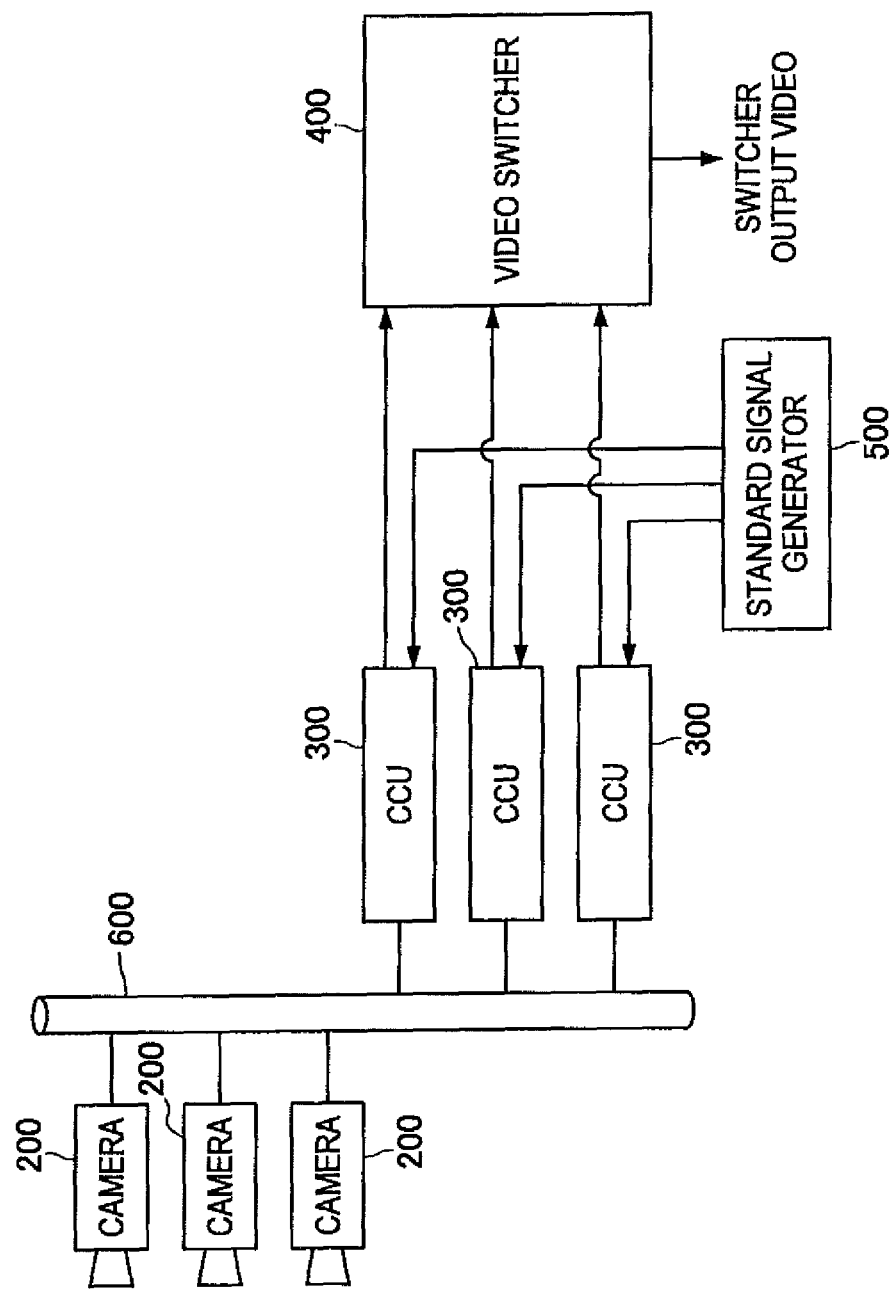
FIG. 2 is a schematic view for illustrating an example of a camera system using an asynchronous transmission network according to an embodiment of the present invention.

FIG. 2 is a schematic view for illustrating an example of a camera system using an asynchronous transmission network according to an embodiment. As FIG. 2 shows, a camera system 100 is configured from a plurality of a CHU (a camera unit) 200, a CCU (a camera control unit) 300, a video switcher 400, and a standard signal generator 500. The camera and the CCU are connected via an asynchronous transmission network 600. Note that the present embodiment exemplifies the Ethernet (a registered trademark) as the asynchronous transmission network 600, however it is not limited to this example.

When a video transmission is performed using the asynchronous transmission network, since a transmission path varies for each combination of each of the CHU 200 and the CCU 300, the delay amount will varies. In this case, it is also possible to align arrival timing of video signals in each of the CCU 300 by adjusting timing, similar to the configuration in FIG. 1 where the CHU 200 and the CCU 300 are connected in a one-to-one basis. However, a route path is not fixed on the asynchronous transmission network 600 and the route path may vary depending on the situation.

Moreover, in perspective of increasing flexibility in the development of the camera system 100, it is desired that switching an asynchronous transmission wire such as a LAN cable, or a device such as a switching hub, a router, or the like, for example, can be flexibly accepted. In this case, the individual adjusting timing as described in FIG. 1 will be difficult to be dealt with.

Further, by using the asynchronous transmission network 600, when a failure occurs on the route path currently in use, there is an advantage in developing a redundant configuration against the failure on a transmission device by changing into a different route path. In such a case, it is also difficult to deal with the individual adjusting timing as explained in FIG. 1.

Further, due to a bandwidth limitation of the asynchronous transmission network, it is assumed that transmission may be performed after a video compression (encoding) in the CHU 200, and the compressed image is to be decompressed (decoding) in the CCU 300. In this case, it is necessary to take into consideration a delay due to the encoding and decoding, after all, dealing with the individual adjusting timing is associated with difficulties.

For the reasons described above, a timing adjustment system of the CHU-CCU which is capable of coping flexibly with configuration changes of the camera system 100 is desired in the CHU-CCU camera system which is configured on the asynchronous transmission network 600.

Figure 3:
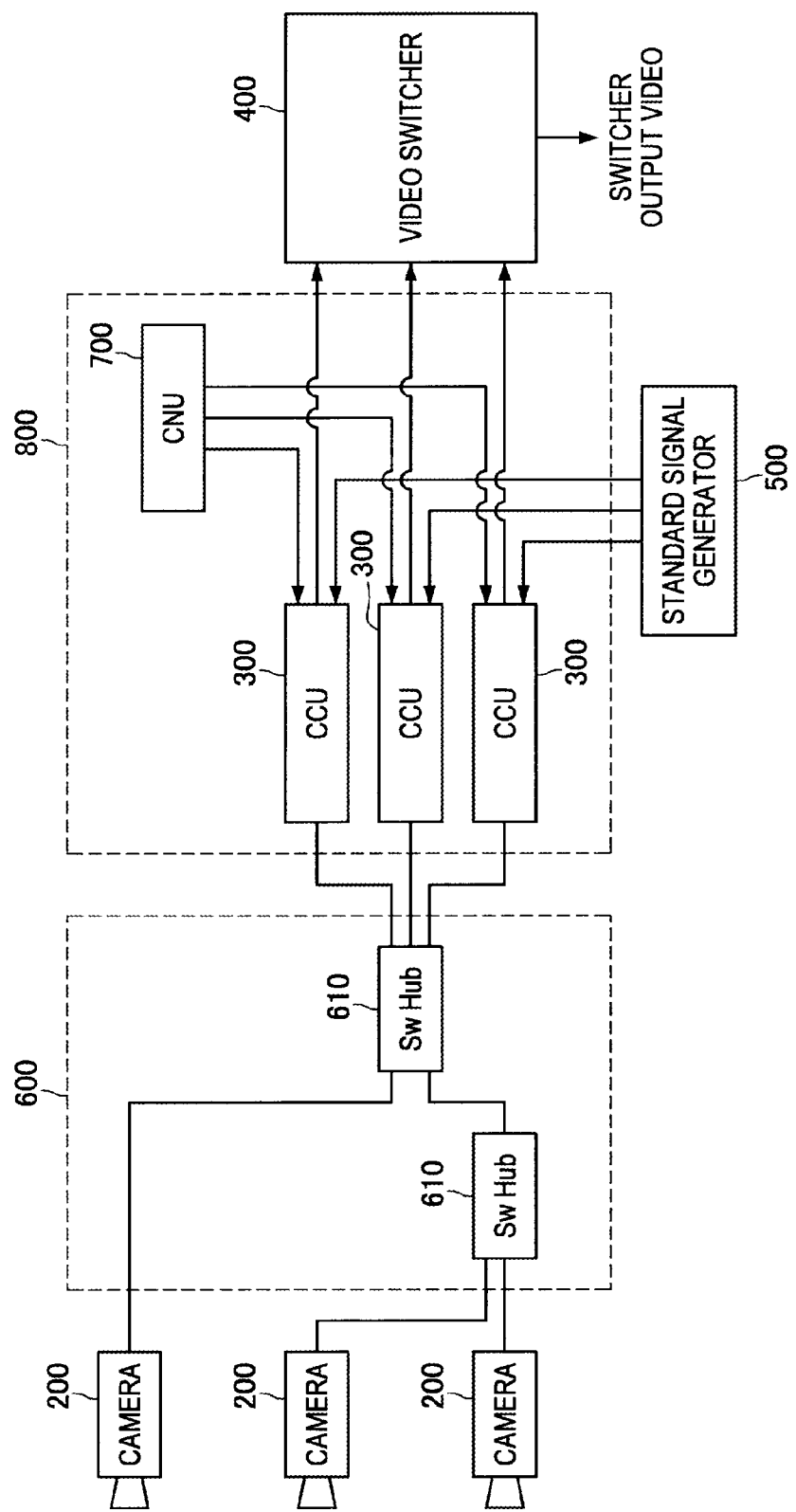
FIG. 3 is a schematic view for illustrating the system illustrated in FIG. 2 in more detail.

FIG. 3 is a schematic view for illustrating the system illustrated in FIG. 2 in more detail. FIG. 2 exemplifies the Ethernet (a registered trademark) as the asynchronous transmission network, however, it is not limited to the Ethernet (a registered trademark). The asynchronous transmission network 600 includes a plurality of a switching hub 610. A plurality of the CHU 200 and a plurality of the CCU 300 are configured so as to correspond with each other on a one-to-one basis, by setting IP address appropriately, for example. Moreover, the reference signal from the standard signal generator 500 is to be transmitted from the CCU 300 to the CHU 200 using the method described in the Patent Literature 2 above or a method of the IEEE1588, or the like. This enables a measurement of the transmission the delay amount between the CHU 200 and the CCU 300.

The configuration shown in FIG. 3 includes a CNU (camera command network unit) 700 in order to adjust a signal delay amount. The CNU 700 has a function for adjusting the signal delay amount. As described later, it is possible not to have the CNU 700, but to set a certain CCU 300 as a master device so that the CCU 300 of the master device is to adjust the delay amount.

In the system shown in FIG. 3, a structural element 800 which has functions of the CCU 300 and the CNU 700 can be configured by a central processing unit, such as a circuit (hardware) or a CPU, or the like, and a program (software) to function the central processing unit. In this case, the program may be stored in a recording medium, such as a memory included with a structural element such as the CCU 300 or the like, or a memory that is inserted externally, or the like.

Figure 4:
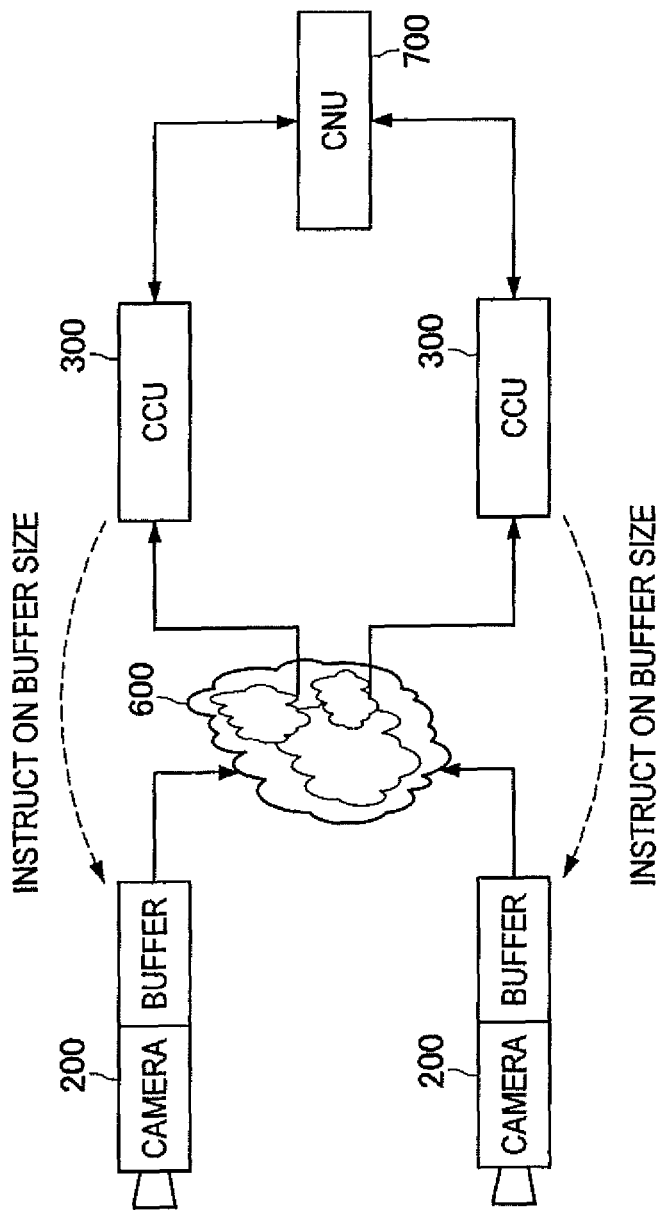
FIG. 4 is a schematic view for illustrating a configuration for adjusting a delay amount in detail.
Figure 5:
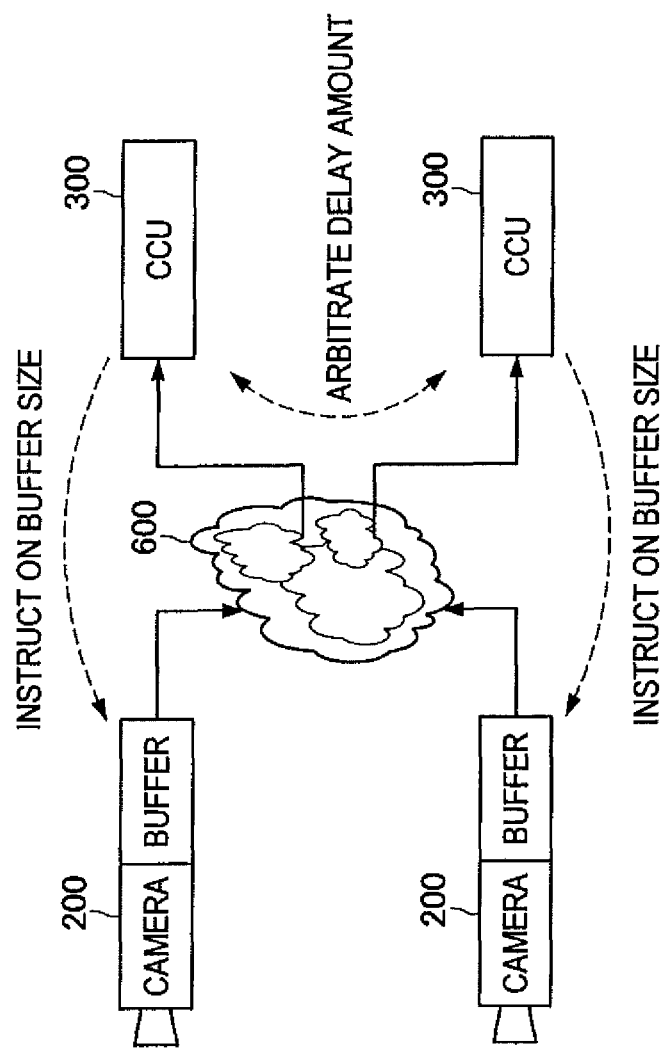
FIG. 5 is a schematic view for illustrating a configuration for adjusting a delay amount in detail.

FIG. 4 and FIG. 5 are schematic views for illustrating a configuration for adjusting the delay amount in detail. A configuration shown in FIG. 4 corresponds to the configuration in FIG. 3, and separately mounts the CNU (camera command network unit) 700 for adjusting the delay amount. The delay amount between the corresponding CHU 200 and the CCU 300 is to be informed from the CCU 300 to CNU 700. The CNU 700 arbitrates the delay amount to determine the optimal delay amount. The determined delay amount is to be informed through the CCU 300 to the CHU 200, and the CHU 200 sets up with a video buffer accordingly in order to align timing of video signals reached at each of the CCU 300.

As a concrete method to determine the delay amount, there is a method for adjusting the video buffer so that, with respect to the pair of the CHU 200 and the CCU 300 whose delay is the largest, the delay amount of another pair of the CHU 200 and the CCU 300 to be the same. The concrete method to determine the delay amount will be explained in detail based on FIG. 6 later. Note that the CNU 700 is used for the arbitration here, however, another structural element can be used as a device for arbitration in place of the CNU 700.

FIG. 5 shows a configuration in which any of the CCU 300 functions as a master device to arbitrate the delay amount without having the CNU 700. As described above, a certain CCU 300 may be configured to perform function of arbitration without mounting newly an additional device for arbitration.

3. Procedure of a System According to the Present Embodiment

Figure 6:
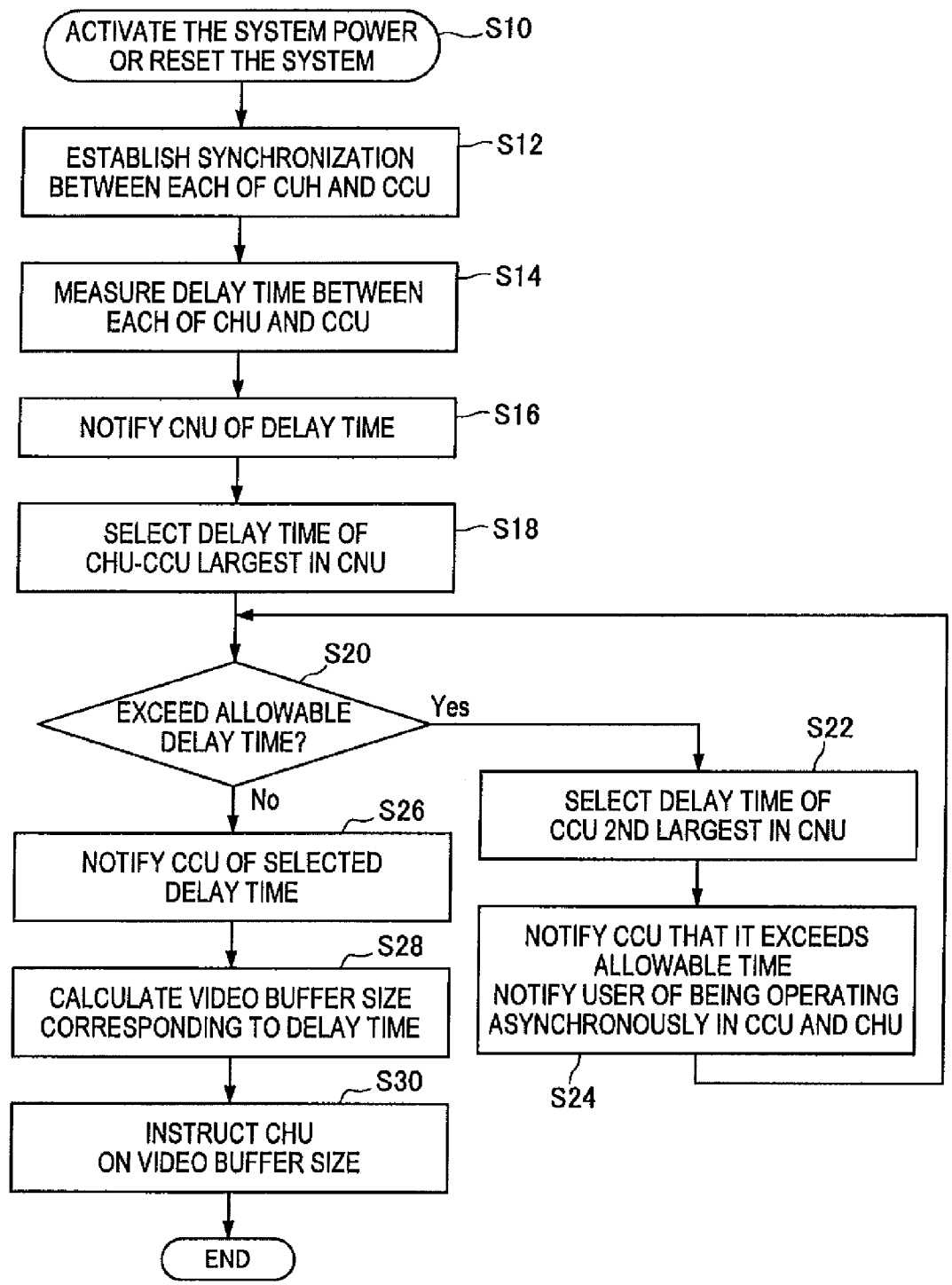
FIG. 6 is a flowchart for illustrating a procedure of the system according to the present embodiment.

FIG. 6 is a flowchart for illustrating a procedure of the system according to the present embodiment. A flow of processing from activating the system power or resetting the system to determining the video buffer will be explained as below. Here, as shown in FIG. 3 and FIG. 4, an explanation will be given on a case where the CNU 700 is set for arbitration.

Firstly, in step S10, activation of the system or resetting the system is performed. When a change is made in the configuration of the asynchronous transmission network 600 (the number of the switching hub 610, etc.), when a change is made in the number of CHU 200, or the like, a calibration is performed for a whole system by a system reset. In the subsequent step S12, synchronization is established between each of the CHU 200 and the CCU 300. In the subsequent step S14, delay time is measured for each of the pair of the corresponding CHU 200 and CCU 300. Measuring the delay time can be performed along with establishing synchronization in step S12, using the method described in the Patent Literature 2 described above, the method of the IEEE1588, or the like. Specifically, the delay time is to be measured by comparing the timing of the video signal obtained in each of the CCU 300 and a reference pulse generated in the standard signal generator 500. In the subsequent step S16, the CCU 300 notifies the CNU 700 of the delay time. In the subsequent step S18, a selection is made for the delay time of a one-pair of the CHU 200 and the CCU 300 whose delay time is the largest in the CNU 700.

In the subsequent step S20, a comparison is made between the selected delay time and a predetermined allowable time, and determination is made on whether the delay time is equal to or more than the allowable time. If the delay time is equal to or more than the allowable time, it proceeds to step S22, and a selection is made for the delay time of a one-pair of the CHU 200 and the CCU 300 whose delay time is the second largest in the CNU 700. In the subsequent step S24, regarding a one-pair of the CHU 200 and the CCU 300 whose delay time exceeds the allowable time, the CCU 300 or the CHU 200 is to be notified that the delay time is more than the allowable time. The one-pair of the CHU 200 and the CCU 300 that has been notified of the notification above displays that it is operating asynchronously in the corresponding CCU 300, the CHU 200 or the video switcher 400, in order to notify the user of being operating asynchronously. If displaying in the CHU 200, it can display within a finder that the CHU 200 includes, as well as on the outside surface of the CHU 200. If displaying in the video switcher 400, it can be displayed, corresponding to each of the CHU 200 close to a selection button of each of the CHU 200 that the video switcher 400 includes. This enables the user to recognize instantly whether a live video image that has been imaged in the selected CHU 200 is synchronizing.

After the step S24, it returns to the step S20, and the same processing is to be performed for the one-pair of CHU 200 and the CCU 300 that has been selected in the step S22. A loop from the step S24 to the step S20 is repeated with respect to the one-pair of the CHU 200 and the CCU 300 selected in the step S22 until the delay time becomes smaller than the allowable time. Therefore, when the delay time is larger than the allowable time regarding another one-pair of the CHU 200 and the CCU 300 which is selected subsequently, the fact that the delay time is larger than the allowable time will be displayed in either the CCU 300, the CHU 200 or the video switcher 400, which enables the user to recognize that the video image that has been imaged is asynchronous.

Meanwhile, in step S20, if the delay time is less than the allowable time regarding the one-pair of the CHU 200 and the CCU 300 that is currently selected, it proceeds to step S26. In step S26, each of the CCU 300 is notified of the delay time of the one-pair of the CHU 200 and the CCU 300 that is currently selected. That is, all of the pairs of the CHU 200 and the CCU 300 whose delay time is smaller than the allowable time are to be notified of the delay time of one of the one-pair of the CHU 200 and the CCU 300 that is currently selected. Note that if the delay amount of all the pairs of the CHU 200 and the CCU 300 are smaller than an allowable delay amount, the delay time of the one-pair of the CHU 200 and the CCU 300 that is currently selected becomes the largest delay time, and the delay time of all other pairs is regarded to be the same with the largest delay time. In the subsequent step S28, in each of the CCU 300, the amount of the video buffer corresponding to the notified delay time is to be calculated. Here, by calculating difference between the current delay time and the allowable delay time, the buffer amount for making the delay time to be the same with the allowable delay time will be calculated.

In the subsequent step S30, each of the CCU 300 indicates the corresponding CHU 200 the calculated video buffer amount. This causes the CHU 200 to create a buffer in a memory for accumulating video signals therein based on the indicated video buffer amount, and to adjust timing of the signals. As shown in FIG. 4, in the CHU 200, a buffer 204 is created in a memory for storing data of video signals obtained in an image pickup element 202. This causes the CHU 200 to set up the buffer to start transmitting video images, therefore, it is possible to adjust timing of the video signals depending on the buffer amount. This causes the delay time to be set to be the same with respect to all of pairs of the CHU 200 and the CCU 300 whose delay time are smaller than the allowable time. Accordingly, since the delay amount of each of the video image are the same when the video images of each of the CHU 200 are switched in the video switcher 400, it is possible to surely avoid distortion of the video signals.

Further, the adjusting timing of signals can be performed not only by creating a buffer, but also by the PLL phase regulation in the CHU 200. In this case, it is possible to make the delay time of signals to be the same with the allowable delay time by adjusting the timing in which the image pickup element 202 clicks a shutter. Further, it is also possible to adjust the timing of signals by creating a buffer in the CCU 300.

By performing processing described above, it is possible to synchronize the signals transmitted from each of the CCU 300 to the video switcher 400. Then, after the step S30, processing will be end (END). Note that pairs of the CHU 200 and the CCU 300 whose the delay time is equal to or more than the allowable time are asynchronous, however, since being asynchronous has been displayed, the user can deal with the video image after recognizing that it is asynchronous.

Note that in the explanations described above, a video buffer that adjusts the delay amount is created in the CHU 200, however, the video buffer can be created in the CCU 300. Also, when the adjusting delay is performed in the CHU 200, the delay amount can be configured not by the buffer, but by the PLL phase regulation. Further, the adjusting delay can be realized using both crating a buffer and the PLL phase regulation.

As described above, according to the present embodiment, it is possible to surely synchronize signals from each of the CHU 200 in a system which can make the transmission path simpler, reduce the cost, and develop a complex camera system with few wiring, by using the asynchronous transmission network. Therefore, it is possible to surely avoid distortion of video signals or audio signals when the video images that have been imaged in the each of the CHU 200 are switched. Further, using the asynchronous transmission network makes the flexibility in changing a camera network increased, and adapting a bus wiring makes the flexibility in wiring increased which leads to increase the flexibility in switching cameras and CCU. Further, by changing a destination address (IP address), it is possible to easily switch a camera (CHU 200) and the CCU 300.

A preferred embodiment of the present invention has been explained in detail above with reference to the attached drawings, the present invention is not limited to this example. It should be understood by those skilled in the art that various modifications, combinations, sub-combinations and alterations may occur depending on design requirements and other factors insofar as they are within the scope of the appended claims or the equivalents thereof.

The invention claimed is:

1. A camera system comprising:
   a plurality of camera pairs each pair having a camera control unit and a camera head unit respectively connected together by way of an asynchronous transmission network; and
   a central processing unit configured to obtain a video signal delay amount, representative of a time delay between a respective camera control unit and its respective camera head unit, for each of the plurality of camera pairs, and to adjust the video signal delay amount between at least one said camera control unit and its respective camera head unit to be equal to a selected video signal delay amount of another said camera control unit and its respective camera head unit
   in which each said camera head unit has a video buffer and the adjustment of the video signal delay amount is implemented by adjusting the video buffer in said at least one camera head unit so as to correspond to the selected video signal delay amount.

2. The camera system of claim 1, further comprising a master device arranged so as to be in communication with the plurality of camera pairs, and in which the central processing unit is arranged in the master device.

3. The camera system of claim 1, in which the central processing unit is arranged in one of the camera control units.

4. The camera system of claim 1, in which the selected video signal delay amount is a largest video signal delay amount among the video signal delay amounts of the plurality of camera pairs.

5. The camera system of claim 4, in which the selected video signal delay amount does not exceed a predetermined allowable time.

6. The camera system of claim 5, in which when the largest video signal delay amount exceeds the predetermined allowable time, the selected video signal delay amount is a next largest video signal delay amount not exceeding the predetermined allowable time among the video signal delay amounts of the plurality of camera pairs.

7. The camera system of claim 1, in which the central processing unit adjusts the video signal delay amount associated with the camera pairs such that the video signal delay amount for each of the camera pairs is equal to the selected video signal delay amount.

8. A signal delay amount adjustment method comprising:
obtaining a video signal delay amount for each of a plurality of camera control units respectively connected to a plurality of camera head units via an asynchronous transmission network, such that each camera control unit is connected to a respective camera head unit via the asynchronous transmission network, in which a respective video signal time delay is representative of a time delay between a respective camera control unit and its respective camera head unit; and
adjusting the video signal delay amount between one said camera control unit and its respective camera head unit to be equal to a selected video signal delay amount of another said camera control unit and its respective camera head unit
in which each said camera head unit has a video buffer and the adjusting of the video signal delay amount is implemented by adjusting the video buffer in said at least one camera head unit so as to correspond to the selected video signal delay amount.

9. A video camera system comprising:
a plurality of camera pairs each having a camera control unit and a camera head unit connected via an asynchronous transmission network, in which each said camera head unit has a video buffer; and
a central processing unit configured:
to obtain a signal delay time for each of the plurality of camera pairs so as to obtain a plurality of signal delay times;
to select a largest signal delay time from the plurality of signal delay times;
to determine if the largest signal delay time exceeds a predetermined allowable time;
to obtain a video buffer size that corresponds to the largest signal delay time, when a determination result indicates that the largest signal delay time does not exceed the predetermined allowable time; and
to adjust a size of the video buffer of at least one of the camera head units to the obtained video buffer size.

10. A camera control unit, comprising:
a network interface that enables communication to a corresponding camera head unit via an asynchronous transmission network, in which the camera control unit and the corresponding camera head unit form a camera pair and in which the network interface also enables communication with a number of other camera pairs via the asynchronous transmission network, each of the number of other camera pairs having a respective camera control unit in communication with its camera head unit; and
a central processing unit configured:
to obtain video signal delay amounts representative of respective time delays of the camera pair and each of the number of other camera pairs, each time delay being indicative of the time delay between a respective camera control unit and its corresponding camera head unit; and
to adjust a video signal delay amount for at least one pair of the number of other camera pairs and the camera pair to be equal to a selected one of the obtained video signal delay amounts
in which each said camera head unit has a video buffer and the adjustment of the video signal delay amount is implemented by adjusting the video buffer in said at least one camera head unit so as to correspond to the selected video signal delay amount.

* * * * *